US012645978B2

(12) United States Patent
Albrecht et al.

(10) Patent No.: US 12,645,978 B2
(45) Date of Patent: Jun. 2, 2026

(54) EFFICIENT FLOOD WATERS ANALYSIS FROM SPATIO-TEMPORAL DATA FUSION AND STATISTICS

(71) Applicant: International Business Machines Corporation, Armonk, NY (US)

(72) Inventors: Conrad M Albrecht, White Plains, NY (US); Marcus Oliver Freitag, Pleasantville, NY (US); Siyuan Lu, Yorktown Heights, NY (US); Hendrik F. Hamann, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1175 days.

(21) Appl. No.: 17/096,982

(22) Filed: Nov. 13, 2020

(65) Prior Publication Data

US 2022/0156636 A1 May 19, 2022

(51) Int. Cl.
G06N 20/00 (2019.01)
G01C 11/04 (2006.01)
(Continued)

(52) U.S. Cl.
CPC .............. G06N 20/00 (2019.01); G01C 11/04 (2013.01); G01W 1/10 (2013.01); G06F 16/29 (2019.01)

(58) Field of Classification Search
CPC ......... G06N 20/00; G06F 16/29; G01C 11/04; G01W 1/10
See application file for complete search history.

(56) References Cited

U.S. PATENT DOCUMENTS 7,654,826 B2 2/2010 Faulkner et al.
10,268,740 B2 * 4/2019 Satkunarajah ........ G06F 16/258
(Continued)

FOREIGN PATENT DOCUMENTS

CN 104615883 B * 12/2017
KR 101448223 B1 9/2014
KR 101976959 B1 5/2019

OTHER PUBLICATIONS

Of Zhao G, et al. "Urban flood susceptibility assessment based on convolutional neural networks." Journal of Hydrology. (Year: 2020).*
(Continued)

*Primary Examiner* — Adam C Standke
(74) *Attorney, Agent, or Firm* — Robert D. Bean

(57) ABSTRACT

In an approach for efficient flood water analysis from spatio-temporal data fusion and statistics, a processor classifies regular waters by using cartographic data in a first location. A processor generates a water stream network including a watershed based on elevation data. A processor performs statistical analysis of spectral information from a multi-spectral satellite imagery over water bodies including the regular waters and flood waters. A processor correlates the spectral statistics of the multi-spectral satellite imagery to kinetic energy of the flood waters using machine learning techniques and physical modeling. A processor builds a learning model based on the correlation between the spectral statistics and the flood waters with the kinetic energy. A processor estimates kinetic energy of flood waters in a second location using the learning model. A processor evaluates a flooding risk for the second location based on the estimated flood waters kinetic energy.

18 Claims, 8 Drawing Sheets

(51) Int. Cl.

| | |
|---|---|
| *G01W 1/10* | (2006.01) |
| *G06F 16/29* | (2019.01) |

(56) References Cited

U.S. PATENT DOCUMENTS

| | | | |
|---|---|---|---|
| 10,783,173 B2 * | 9/2020 | Peterson | ............ G06F 16/24568 |
| 2011/0153368 A1 | 6/2011 | Pierre et al. | |

OTHER PUBLICATIONS

Arbault, Damien, et al. "A first global and spatially explicit emergy database of rivers and streams based on high-resolution GIS-maps." Ecological Modelling 281 (Year: 2014).*

Sarker, Chandrama, et al. "Flood mapping with convolutional neural networks using spatio-contextual pixel information." Remote Sensing 11.19 (Year: 2019).*

Zhao G, et al. "Urban flood susceptibility assessment based on convolutional neural networks." Journal of Hydrology. (Year: 2020).*

Aristizabal et al., "High-resolution inundation mapping for heterogeneous land covers with synthetic aperture radar and terrain data." Remote Sensing. (Year: 2020).*

Wieland, Marc, and Sandro Martinis. "A modular processing chain for automated flood monitoring from multi-spectral satellite data." Remote Sensing 11.19 (Year: 2019).*

Jain P, Schoen-Phelan B, Ross R. Automatic flood detection in Sentinel-2 images using deep convolutional neural networks. In Proceedings of the 35th Annual ACM Symposium on Applied Computing Mar. 30, 2020 (pp. 617-623). (Year: 2020).*

Gray et al., "A Semantically Enabled Service Architecture for Mashups over Streaming and Stored Data", ESWC 2011, Part II, LNCS 6644, pp. 300-314, 2011, <http://dx.doi.org/10.1007/978-3-642-21064-8_21>.

Kussul et al., "Interoperable Infrastructure for Flood Monitoring: SensorWeb, Grid and Cloud," IEEE Journal of Selected Topics in Applied Earth Observations and Remote Sensing, vol. 5, No. 6, Dec. 2012, 6 pages, <http://dx.doi.org/10.1109/JSTARS.2012.2192417>.

Mohammed, Soha A., "Application of satellite image processing and GIS-Spatial modeling for mapping urban areas prone to flash floods in Qena governorate", Journal of African Earth Sciences, vol. 158, May 24, 2019, pp. 218-232, <http://dx.doi.org/10.1016/j.jafrearsci.2019.05.015>.

Tong et al., "An approach for flood monitoring by the combined use of Landsat 8 optical imagery and COSMO-SkyMed radar imagery", ISPRS Journal of Photogrammetry and Remote Sensing, vol. 136, Feb. 2018, pp. 144-153, <https://doi.org/10.1016/j.isprsjprs.2017.11.006>.

Mell et al., "The NIST Definition of Cloud Computing", Recommendations of the National Institute of Standards and Technology, Special Publication 800-145, Sep. 2011, 7 pages.

Wikipedia, "2013 European floods", https://en.wikipedia.orgwiki/2013_European_floods, 10 pages.

* cited by examiner

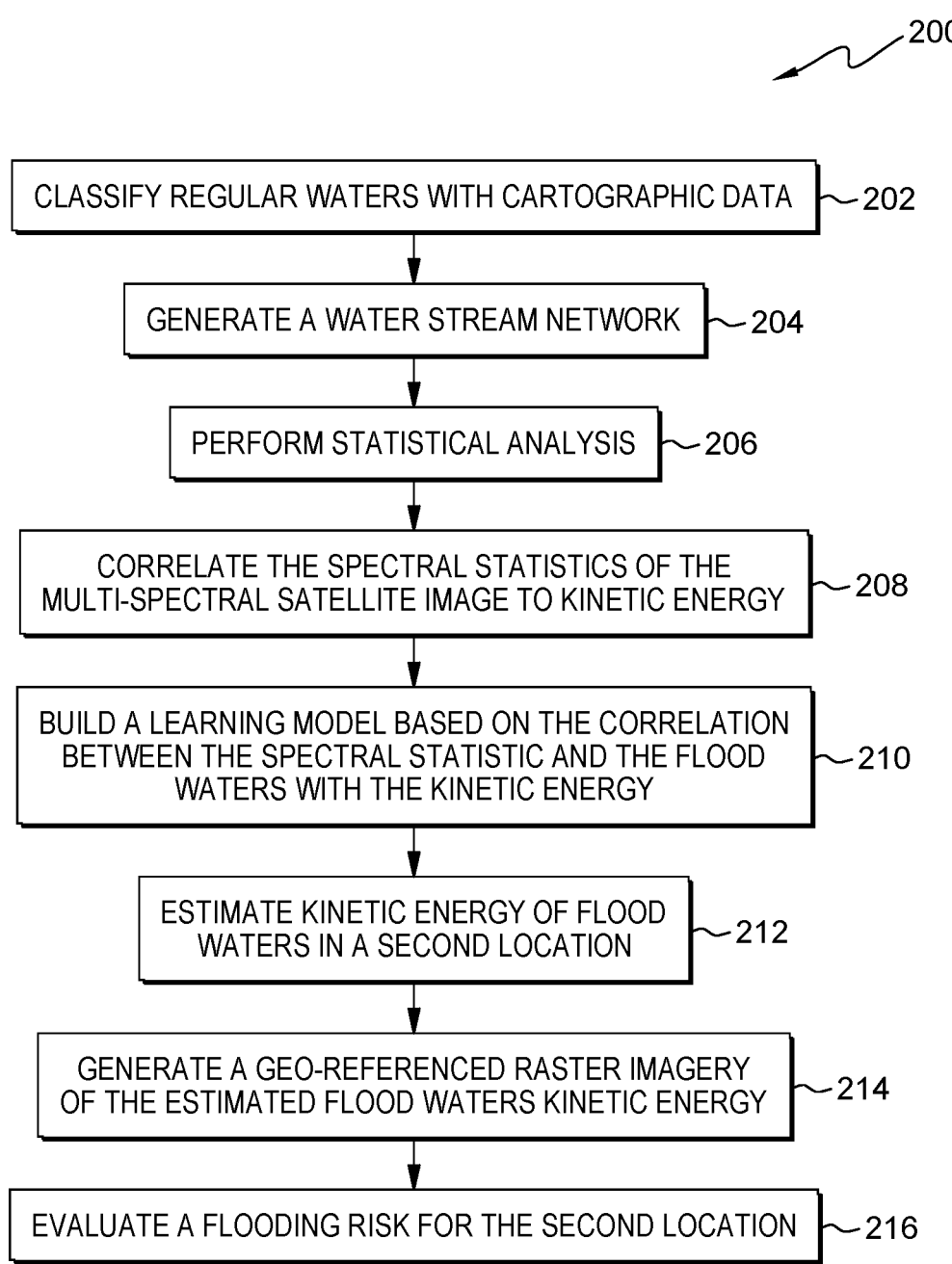

CLASSIFY REGULAR WATERS WITH CARTOGRAPHIC DATA ~202

GENERATE A WATER STREAM NETWORK ~204

PERFORM STATISTICAL ANALYSIS ~206

CORRELATE THE SPECTRAL STATISTICS OF THE MULTI-SPECTRAL SATELLITE IMAGE TO KINETIC ENERGY ~208

BUILD A LEARNING MODEL BASED ON THE CORRELATION BETWEEN THE SPECTRAL STATISTIC AND THE FLOOD WATERS WITH THE KINETIC ENERGY ~210

ESTIMATE KINETIC ENERGY OF FLOOD WATERS IN A SECOND LOCATION ~212

GENERATE A GEO-REFERENCED RASTER IMAGERY OF THE ESTIMATED FLOOD WATERS KINETIC ENERGY ~214

EVALUATE A FLOODING RISK FOR THE SECOND LOCATION ~216

FIG. 2

EFFICIENT FLOOD WATERS ANALYSIS FROM SPATIO-TEMPORAL DATA FUSION AND STATISTICS

BACKGROUND

The present disclosure relates generally to the field of data analysis and statistics, and more particularly to efficient flood water analysis from spatio-temporal data fusion and statistics.

Data analysis is a process of inspecting, cleansing, transforming and modeling data with the goal of discovering useful information, informing conclusions and supporting decision-making. Data analysis may have multiple facets and approaches, encompassing diverse techniques under a variety of names, and may be used in different business, science, and social science domains. A multi-spectral image may be one that captures image data within specific wavelength ranges across the electromagnetic spectrum. The wavelengths may be separated by filters or detected via the use of instruments that are sensitive to particular wavelengths, including light from frequencies beyond the visible light range, i.e., infrared and ultra-violet. In general, spectral analysis may be analysis in terms of a spectrum of frequencies or related quantities such as frequency dependent energy values of photons (quanta of light), eigenvalue decomposition of Hermitian or symmetric matrices. Data fusion is the process of integrating multiple data sources to produce more consistent, accurate, and useful information than that provided by an individual data source. Data fusion processes may be often categorized as low, intermediate, or high, depending on the processing stage at which fusion takes place.

SUMMARY

Aspects of an embodiment of the present disclosure disclose an approach for efficient flood water analysis from spatio-temporal data fusion and statistics. A processor classifies regular waters by using cartographic data in a first location. A processor generates a water stream network including a watershed based on elevation data. A processor performs statistical analysis of spectral information from a multi-spectral satellite imagery over water bodies including the regular waters and flood waters. A processor correlates the spectral statistics of the multi-spectral satellite imagery to kinetic energy of the flood waters using machine learning techniques and physical modeling. A processor builds a learning model based on the correlation between the spectral statistics and the flood waters with the kinetic energy. A processor estimates kinetic energy of flood waters in a second location using the learning model. A processor evaluates a flooding risk for the second location based on the estimated flood waters kinetic energy.

BRIEF DESCRIPTION OF THE DRAWINGS

FIG. 2 is a flowchart depicting operational steps of a flood analysis module within a computing device of FIG. 1, in accordance with an embodiment of the present disclosure.

DETAILED DESCRIPTION

Figure 1:
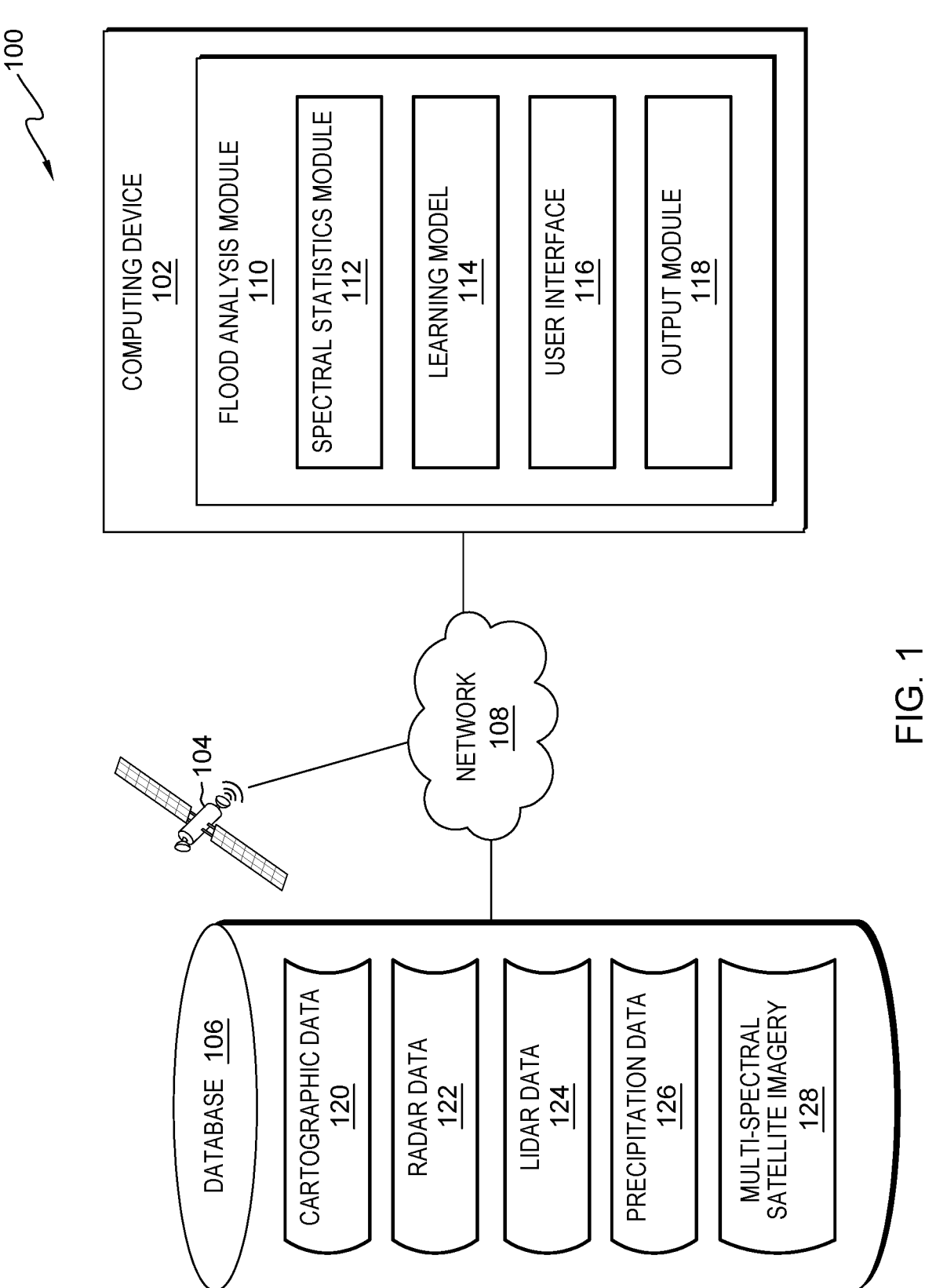
FIG. 1 is a functional block diagram illustrating a flood-water analysis environment, in accordance with an embodiment of the present disclosure.

The present disclosure is directed to systems and methods for efficient flood water analysis from spatio-temporal data fusion and statistics.

Embodiments of the present disclosure recognize a need for exploiting geospatial data fusion and statistics for flood waters analysis. Embodiments of the present disclosure disclose taking cartographic information, Radar (radio detection and ranging) data, and LiDAR (light detection and ranging) data to classify regular/non-flood water bodies (e.g., lakes, dams, river streams). Embodiments of the present disclosure disclose using elevation data to generate a water stream network and delineate a watershed starting from a location that has known flood waters. Embodiments of the present disclosure disclose taking a multi-spectral satellite imagery of a flooding event and performing statistics over pixels classified as water bodies. Embodiments of the present disclosure recognize non-flood water bodies are likely still water bodies in a flood, and the spectral properties of water distinguish the regular water from other lands. Embodiments of the present disclosure disclose the spectral statistics of the flood waters are different when compared to ordinary water bodies, for example, high kinetic energy of flood water streams from mountain ranges may be muddy and brownish. Embodiments of the present disclosure disclose using the spectral statistics with and without a flood for visualization of the hydrodynamics of flood waters. Embodiments of the present disclosure disclose using the pixel statistics to identify pixels of flooded land within the water shed identified. Embodiments of the present disclosure disclose estimating kinetic energy of flood waters from color dynamics. Embodiments of the present disclosure disclose using insights in conjunction with weather prediction to identify and rate areas and human infrastructure at risk for an upcoming flooding event.

Embodiments of the present disclosure disclose integration of a method into a scalable spatio-temporal data store for rapid data fusion and visualization interface for a user inspection. Embodiments of the present disclosure disclose allowing a distributed geospatial database to automatically generate geo-referenced raster imagery of estimates of flood waters kinetic energy, based on an input as minimal as a cartographic map of water bodies and a single multi-spectral satellite image. Using more satellite imagery potentially simply improves accuracy of the kinetic energy estimates. Embodiments of the present disclosure disclose geospatially registered visualization of cartographic data and semi-transparent overlay of the result (e.g., flood waters' kinetic energy and extent of the flood) with opacity slide bar for analysts to inspect an area of interest. Embodiments of the present disclosure disclose presenting a geospatial video sequence for temporal evolution analysis when multiple satellite imagery snapshots are available to repeat. Embodiments of the present disclosure disclose providing a result in computer consumable, downloadable data formats such as geo-referenced imagery for the analyst to further process. Embodiments of the present disclosure disclose delivering the result to the cloud for further scalable, task specific processing. Embodiments of the present disclosure disclose populating a new raster data layer of the scalable spatio-temporal data store that can be used to filter and fuse with other existing data available in a system such as population density.

Embodiments of the present disclosure disclose data fusion with cartographic information, weather data, and stream network information to generate spectral statistics. Embodiments of the present disclosure disclose visualization of the hydrodynamics of flood waters on spectral statistics of satellite imagery potentially assisted by stream network building from elevation data and aggregation of precipitation from weather (forecasting). Embodiments of the present disclosure disclose visualization of the hydro-dynamics of flood waters including identifying scenes where the kinetic energy of waters is known or can be estimated from, e.g., available elevation and precipitation data or hydrodynamic modeling, correlating the spectral statistics of the satellite imagery to the kinetic energy of the water, e.g., by machine learning techniques, and estimating kinetic energy for flood waters (machine learning inference) where the information is desired, but cannot be derived by other means. Embodiments of the present disclosure disclose providing emergency response and urban infrastructure planning from visual presentation of results of visualization of the hydrodynamics of flood waters. Embodiments of the present disclosure disclose use historical data of visualization of the hydrodynamics of flood waters to estimate the flood risk of properties. Embodiments of the present disclosure disclose deriving local/relative contour lines of terrain from a time series of the flood and validating contour lines against existing elevation data.

The present disclosure will now be described in detail with reference to the Figures. FIG. 1 is a functional block diagram illustrating floodwater analysis environment, generally designated 100, in accordance with an embodiment of the present disclosure.

In the depicted embodiment, floodwater analysis environment 100 includes computing device 102, remote sensing data collector 104, database 106, and network 108. In one or more embodiments, remote sensing data collector 104 may sense and collect data for database 106. For example, remote sensing data collector 104 may be a satellite. Remote sensing data collector 104 may sense and take multi-spectral satellite imagery 128. Remote sensing data collector 104 may sense and collect cartographic data 120, Radar data 122, LiDAR data 124, and precipitation data 126. Remote sensing data collector 104 may communicate through a communication network such as network 108 with computing device 102 and database 106.

In the depicted embodiment, database 106 is located externally and accessed through a communication network such as network 108. However, in other embodiments, database 106 may be located on computing device 102. In one or more embodiments, database 106 may include cartographic data 120, Radar data 122, LiDAR data 124, precipitation data 126, and multi-spectral satellite imagery 128. In the depicted embodiment, cartographic data 120, Radar data 122, LiDAR data 124, precipitation data 126, and multi-spectral satellite imagery 128 are located on database 106. However, in other embodiments, cartographic data 120, Radar data 122, LiDAR data 124, precipitation data 126, and multi-spectral satellite imagery 128 may be located externally and accessed through a communication network such as network 108. In another embodiment, cartographic data 120, Radar data 122, LiDAR data 124, precipitation data 126, and multi-spectral satellite imagery 128 may be located in computing device 102. In an example, database 106 may include massive geospatial-temporal data (e.g., maps, satellite, weather, drone, Internet of Things). In one or more embodiments, cartographic data 120 may include map information. In an example, cartographic data 120 may be a map data of the world. Cartographic data 120 may be collected using manual survey, global positioning service (GPS) devices, aerial photography, and other sources, or use local knowledge of an area. Cartographic data 120 can be used in various ways including production of paper maps and electronic maps, geocoding of address and place names, and route planning. In an example, cartographic data 120 may be a raster image (e.g., arrays of discrete numerical integer values) or vectorized data (e.g., a collection of points, lines, and (multi-)polygons). In one or more embodiments, Radar data 122 may be data that is detected and collected by an object detection system that uses radio waves to determine the range, altitude, direction of movement, and speed of objects. Moreover, Radar polarization carries information on the object's surface properties. In one or more embodiments, LiDAR data 124 may be data that is detected and collected in a technology of light detection and ranging that uses light in the form of a pulsed laser to measure ranges (variable distances) to the Earth by (multiple) pulses reflected. These light pulses—combined with other data recorded by airborne or satellite mounted systems—generate precise, three-dimensional information about the shape of the Earth and its surface characteristics. In one or more embodiments, precipitation data 126 can include information about precipitation based on weather forecasting or actual precipitation in an area, e.g., through weather Radar technologies. In one or more embodiments, multi-spectral satellite imagery 128 may be an image of Earth collected by remote sensing data collector 104. In an example, multi-spectral satellite imagery 128 can be collected from NASA's Landsat 8 satellite mission. The Landsat program may provide repetitive acquisition of high resolution multi-spectral data of the Earth's surface on a global basis. Multi-spectral satellite imagery 128 can be in visible colors and in other spectral bands, e.g., in the range of infrared wavelengths. The spatial and temporal resolution of multi-spectral satellite imagery 128 may vary depending on the instrument used and the specifics of the satellite's orbit. Spectral resolution may be defined by the wavelength interval size (discrete segment of the electromagnetic spectrum) and number of intervals that the instrument is measuring.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to flood analysis module 110 and network 108 and is capable of processing program instructions and executing flood analysis module 110, in accordance with an embodiment of the present disclosure. Computing device 102 may include internal and external hardware components, as depicted and described in further detail with respect to FIG. 5.

Further, in the depicted embodiment, computing device 102 includes flood analysis module 110. In the depicted embodiment, flood analysis module 110 is located on computing device 102. However, in other embodiments, flood analysis module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and flood analysis module 110, in accordance with a desired embodiment of the disclosure.

In one or more embodiments, flood analysis module 110 may be configured to classify regular waters based on cartographic data 120 for a certain location. Flood analysis module 110 may take cartographic data 120, Radar data 122, and LiDAR data 124 to classify regular (e.g., non-flood) water bodies. For example, regular water bodies may be regular waters in lakes, dams, and river streams. Cartographic data 120 may include map information for the certain location. Cartographic data 120 may be map data of the certain location. Cartographic data 120 may include map information. Cartographic data 120 may be collected using manual survey, GPS devices, aerial photography, and other sources, or use local knowledge of an area. Cartographic data 120 may be a raster image (e.g., a series of pixels, dots or lines). Radar data 122 may be data that is detected and collected by an object detection system that uses radio waves to determine the range, altitude, surface properties, direction of movement, and speed of objects. LiDAR data 124 may be data that is detected and collected in a technology of light detection and ranging that uses light in the form of a pulsed laser to measure ranges (variable distances).

In one or more embodiments, flood analysis module 110 may be configured to generate a water stream network including a watershed based on elevation data, for example, from Radar data 122 and LiDAR data 124. Flood analysis module 110 may use the elevation data to generate the water stream network and delineate the watershed starting from a location that has known flood waters. Flood analysis module 110 may identify scenes where the kinetic energy of waters is known or can be estimated from available elevation data and precipitation data 126.

In one or more embodiments, flood analysis module 110 may be configured to perform statistical analysis of spectral information from multi-spectral satellite imagery 128 over water bodies including the regular waters and flood waters. Flood analysis module 110 may take multi-spectral satellite imagery 128 of a flooding event and perform statistics over pixels classified as water bodies from cartographic data 120 for a certain location. Flood analysis module 110 may recognize non-flood water bodies are likely still water bodies in a flood. Flood analysis module may recognize the spectral properties of waters distinguish the waters from other lands. Flood analysis module 110 may determine that the statistics of the flood waters is different when compared to ordinary water bodies. For example, flood analysis module 110 may recognize that flood water streams may have high kinetic energy and can be muddy and brownish by comparing the spectral statistics with and without a flood.

Flood analysis module 110 may use the pixel statistics to identify pixels of flooded land within the watershed identified to locally confine areas of flooding. Flood analysis module 110 may use the elevation data to assist in identifying pixels of flooded land. Flood analysis module 110 may further confine potential areas of flooding on a global scale in the watershed with the water stream network in conjunction with the fusion of temporally aggregated precipitation data 126.

In one or more embodiments, flood analysis module 110 may be configured to correlate the spectral statistics of multi-spectral satellite imagery 128 to kinetic energy of the flood waters using machine learning techniques. Flood analysis module 110 may estimate kinetic energy of flood waters from color dynamics. For example, given that areas with water body marked in a map carries flood waters, flood analysis module 110 may pick a region around a dam to infer flood water's pixel value statistics for the different spectral bands. Flood analysis module 110 may query the satellite raster bands filtered against rasterized cartographic data where the water body has a given, well-defined color code, typically bluish, i.e., the RedGreenBlue (RGB) representation of the rasterized map that has high value for blue and low values for the other colors, e.g. (R, G, B)=(255, 20, 20).

In one or more embodiments, flood analysis module 110 may be configured to build learning model 114 based on the correlation between the spectral statistics and the flood waters with kinetic energy. Flood analysis module 110 may perform data fusion with cartographic data 120, weather data (e.g., precipitation data 126), and stream network information to generate spectral statistics. Flood analysis module 110 may perform visualization of the hydrodynamics of flood waters on spectral statistics of satellite imagery potentially assisted by stream network building from elevation data and aggregation of precipitation from weather (forecasting).

In one or more embodiments, flood analysis module 110 may be configured to estimate kinetic energy of flood waters in a second location using learning model 114. Flood analysis module 110 may use insights from learning model 114 in conjunction with weather prediction to identify and rate areas and human infrastructure at risk for an upcoming flooding event. Flood analysis module 110 may estimate kinetic energy for flood waters (machine learning inference) where the information is desired, but cannot be derived by other means. Flood analysis module 110 may provide emergency response and urban infrastructure planning from visual presentation of results of visualization of the hydrodynamics of flood waters.

In one or more embodiments, flood analysis module 110 may be configured to generate a geo-referenced raster imagery of the estimated flood waters kinetic energy. Flood analysis module 110 may integrate a scalable spatio-temporal data store for rapid data fusion and visualization interface for a user inspection. Given learning model 114 has been trained before, flood analysis module 110 may allow a distributed geospatial database to automatically generate geo-referenced raster imagery of estimates of flood waters kinetic energy, solely based on an input as minimal as a cartographic map of water bodies and a single multi-spectral satellite image. Flood analysis module 110 may use more satellite imagery potentially simply to improve accuracy of the kinetic energy estimates. Flood analysis module 110 may provide geospatially registered visualization of cartographic data 120 and semi-transparent overlay of estimated flood water's kinetic energy and extent of flood with opacity slide bar for analysts to inspect area of interest. Flood analysis module 110 may present a geospatial video sequence for temporal evolution analysis by using multiple satellite imagery snapshots. Flood analysis module 110 may provide a result in computer consumable, downloadable data formats such as geo-referenced imagery (e.g., in GeoTIFF file format) for the analyst to further process. Flood analysis module 110 may assemble a query for flood waters visualization, for example, a red and near-infrared band may indicate a strong signal. Flood analysis module 110 may filter multiple bands (e.g., blue, green, red, near-infrared, and short-wave infrared) of multi-spectral satellite imagery 128 by restricting to numerical values not bigger than about the mean plus two standard deviations and not smaller than the minimum value. Flood analysis module 110 may recognize geospatial pixels that are not flood waters may have values less likely in all the bands given. Flood analysis module 110 may provide colorization of water that helps to understand how backwater forms and might become a problem although a smaller creek feeding the main river might not carry high level waters itself. Flood analysis module 110 may provide different coloring of flood waters to help interpret the kinetic energy involved. For example, flood analysis module 110 may provide color-encoding, e.g., blue color for still water (not muddy), green color for active flood waters, yellow and red colors for highly muddy water, i.e. high kinetic energy involved. Flood analysis module 110 may indicate the floodwaters state that helps to estimate human infrastructure at risk close to the water. Flood analysis module 110 may recognize human dam infrastructure at work. In an example, flood analysis module 110 may recognize islands in the floods crosschecking the elevation context, e.g., human infrastructure facilities in the floods being elevated compared to the surroundings of the floods, blue color for low elevation, green color for an average elevation, red color for high elevation.

In one or more embodiments, flood analysis module 110 may be configured to evaluate a flooding risk for a second location based on the estimated flood waters kinetic energy in conjunction with a weather prediction for an upcoming flooding event. Flood analysis module 110 may populate a new raster data layer of the scalable spatio-temporal data store that can be used to filter and fuse with other existing data available in database such as population density. Flood analysis module 110 may output emergency response and urban infrastructure planning from visual presentation of results of visualization of the hydrodynamics of flood waters. For example, flood analysis module 110 may output information about where the flooding is. Flood analysis module 110 may estimate and output how serious the flood waters is based on the result of visualization of the hydrodynamics of flood waters. Flood analysis module 110 may indicate which infrastructure is at risk to be damaged or destructed. In another example, flood analysis module 110 may provide property ratings for insurance. For example, flood analysis module 110 may use historical data of visualization of the hydrodynamics of flood waters to estimate a flood risk of a property. Flood analysis module 110 may take kinetic energy estimation and geospatially integrate the values in a given radius around the property's center, e.g., the higher the value the higher the risk of damage to the property. Flood analysis module 110 may perform terrain analysis by deriving local and relative contour lines of terrain from a time series of the flood. Flood analysis module 110 may validate contour lines against existing elevation data.

In the depicted embodiment, flood analysis module 110 includes spectral statistics module 112, learning model 114, user interface 116, and output module 118. In one or more embodiments, spectral statistics module 112 may be configured to perform statistical analysis of spectral information from multi-spectral satellite imagery 128 over water bodies including the regular waters and flood waters. Spectral statistics module 112 may take multi-spectral satellite imagery 128 of a flooding event and perform statistics over pixels classified as water bodies from cartographic data 120 for a certain location. Spectral statistics module 112 may recognize non-flood water bodies are likely still water bodies in a flood. Spectral statistics module 112 may recognize the spectral properties of waters distinguish the waters from other lands. Spectral statistics module 112 may determine that the statistics of the flood waters is different when compared to ordinary water bodies. For example, spectral statistics module 112 may recognize that flood water streams may have high kinetic energy and can be muddy and brownish by comparing the spectral statistics with and without a flood. Spectral statistics module 112 may use the pixel statistics to identify pixels of flooded land within the watershed identified to locally confine areas of flooding. Spectral statistics module 112 may use the elevation data to assist in identifying pixels of flooded land. Spectral statistics module 112 may further confine potential areas of flooding on a global scale in the watershed with the water stream network in conjunction with the fusion of temporally aggregated precipitation data 126.

In one or more embodiments, learning model 114 may be configured to correlate the spectral statistics of multi-spectral satellite imagery 128 to kinetic energy of the flood waters using machine learning techniques. Learning model 114 may estimate kinetic energy of flood waters by correlating physical modeling with the spectral statistics. For example, given that areas with water body marked in a map carries flood waters, learning model 114 may pick a region around a dam to infer flood water's pixel value statistics for the different spectral bands. At the same time, physical modeling of runoff from precipitation data, digital elevation models and terrain information such as soil type etc., provide an estimate of the flood water's kinetic energy entering the dam's basin. Learning model 114 may query the satellite raster bands filtered against rasterized cartographic data where the water body has a given, well-defined color code, typically bluish, i.e. the RGB representation of the rasterized map has high value for blue and low values for the other colors, e.g. (R, G, B)=(255, 20, 20). Learning model 114 may perform data fusion with cartographic data 120, weather data (e.g., precipitation data 126), and stream network information to generate spectral statistics. Learning model 114 may perform visualization of the hydrodynamics of flood waters on spectral statistics of satellite imagery potentially assisted by stream network building from elevation data and aggregation of precipitation from weather (forecasting).

In one or more embodiments, learning model 114 may be configured to estimate kinetic energy of flood waters in a second location. Learning model 114 may provide insights in conjunction with weather prediction to identify and rate areas and human infrastructure at risk for an upcoming flooding event. Learning model 114 may estimate kinetic energy for flood waters (machine learning inference) where the information is desired, but cannot be derived by other means such as e.g. physical modeling as employed for training learning model 114. Learning model 114 may provide emergency response and urban infrastructure planning from visual presentation of results of visualization of the hydrodynamics of flood waters.

In one or more embodiments, learning model 114 may be configured to generate a geo-referenced raster imagery of the estimated flood waters kinetic energy. Learning model 114 may integrate a scalable spatio-temporal data store for rapid data fusion and visualization interface for a user inspection. Learning model 114 may allow a distributed geospatial database to automatically generate geo-referenced raster imagery of estimates of flood waters kinetic energy, solely based on an input as minimal as a cartographic map of water bodies and a single multi-spectral satellite image. Learning model 114 may use more satellite imagery potentially simply to improve accuracy of the kinetic energy estimates. Learning model 114 may provide geospatially registered visualization of cartographic data 120 and semi-transparent overlay of estimated flood water's kinetic energy and extent of flood with opacity slide bar for analysts to inspect area of interest. Learning model 114 may present a geospatial video sequence for temporal evolution analysis by using multiple satellite imagery snapshots. Learning model 114 may provide a result in computer consumable, downloadable data formats such as geo-referenced imagery (e.g., in a GeoTIFF format) for the analyst to further process. Learning model 114 may assemble a query for flood waters visualization, for example, a red and near-infrared band may indicate a strong signal. Learning model 114 may filter multiple bands (e.g., blue, green, red, near-infrared, and short-wave infrared) of multi-spectral satellite imagery 128 by restricting to numerical values not bigger than about the mean plus two standard deviations and not smaller than the minimum value. Learning model 114 may recognize geospatial pixels that are not flood waters may have values less likely in all the bands given. In an example, learning model 114 may detect noise due to cloud shadows that reduce the overall reflectance from the ground bringing it close to that of water that is heavily absorbing in all bands under consideration—except for the reddish signal from the muddy flood waters. Learning model 114 may provide colorization of water that helps to understand how backwater forms and might become a problem although a smaller creek feeding the main river might not carry high level waters itself. Learning model 114 may provide different coloring of flood waters to help interpret the kinetic energy involved. For example, learning model 114 may provide color-encoding, e.g., blue color for still water (not muddy), green color for active flood waters, yellow and red colors for highly muddy water, i.e. high kinetic energy involved. Learning model 114 may indicate the floodwaters state that helps to estimate human infrastructure at risk close to the water. Learning model 114 may recognize human dam infrastructure at work, e.g. by estimating the water current through the outlet of the dam. In another example, besides artifacts from clouds, learning model 114 may recognizes some islands in the floods crosschecking the elevation context, e.g. human infrastructure facilities in the floods being elevated compared to the surroundings of the floods, blue color for low elevation, green color for an average elevation, red color for high elevation.

In one or more embodiments, learning model 114 may be configured to evaluate a flooding risk for a second location based on the estimated flood waters kinetic energy in conjunction with a weather prediction for an upcoming flooding event. Learning model 114 may populate a new raster data layer of the scalable spatio-temporal data store that can be used to filter and fuse with other existing data available in database such as population density. Learning model 114 may output emergency response and urban infrastructure planning from visual presentation of results of visualization of the hydrodynamics of flood waters. For example, learning model 114 may output information about where the flooding is. Learning model 114 may estimate and output how serious the flood waters is based on the results of visualization of the hydrodynamics of flood waters. Learning model 114 may indicate which infrastructure is at risk to be damaged or destructed. In another example, learning model 114 may provide property ratings for insurance. For example, learning model 114 may use historical data of visualization of the hydrodynamics of flood waters to estimate a flood risk of a property. Learning model 114 may take kinetic energy estimation and geospatially integrate the values in a given radius around the property's center, e.g., the higher the value the higher the risk of damage to the property. Learning model 114 may perform terrain analysis by deriving local and relative contour lines of terrain from a time series of the flood. Learning model 114 may validate contour lines against existing elevation data.

In one or more embodiments, user interface 116 may be configured to provide an interface between a user and computing device 102. For example, user interface 116 can be a browser with an application programming interface (API) plugin to access database 106. In an example, the browser with an API plugin can have a representational state transfer (REST) architecture that defines a set of constraints to be used for creating web services. Web services that conform to the REST architectural style, called RESTful web services, provide interoperability between computer systems on the internet. RESTful web services allow the requesting systems to access and manipulate textual representations of web resources by using a uniform and predefined set of stateless operations. In another example, user interface 116 may provide a command line tool and access credentials to database 106.

In one or more embodiments, output module 118 may be configured to output downloadable data formats such as geo-referenced TIFF imagery for the analyst to further process. Output module 118 may send the result to the cloud for further scalable, task specific processing. Output module 118 may populate a new raster data layer of the scalable spatio-temporal data store that can be used to then filter and fuse with other existing data available in the system such as population density. Output module 118 may download the query result file and printing the geo meta information, e.g., pixel value statistics, in human-readable formats (e.g., JavaScript Object Notation (JSON) format). Output module 118 may output the geo-referenced raster imagery of the estimated flood waters kinetic energy. Output module 118 may output integrated scalable spatio-temporal data for rapid data fusion and visualization interface for a user inspection. Output module 118 may output geospatially registered visualization of cartographic data 120 and semi-transparent overlay of estimated flood water's kinetic energy and extent of flood with opacity slide bar for analysts to inspect area of interest. Output module 118 may output a result in computer consumable, downloadable data formats such as geo-referenced imagery (e.g., in a GeoTIFF format) for the analyst to further process. Output module 118 may output colorization of water that helps to understand how backwater forms and might become a problem although a smaller creek feeding the main river might not carry high level waters itself. Output module 118 may output different coloring of flood waters to help interpret the kinetic energy involved. For example, output module 118 may present color-encoding, e.g., blue color for still water (not muddy), green color for active flood waters, yellow and red colors for highly muddy water, i.e. high kinetic energy involved.

Output module 118 may output the floodwaters state that helps to estimate human infrastructure at risk close to the water. Output module 118 may output a new raster data layer of the scalable spatio-temporal data store that can be used to filter and fuse with other existing data available in database such as population density. Output module 118 may output emergency response and urban infrastructure planning from visual presentation of results of visualization of the hydrodynamics of flood waters. For example, output module 118 may output information about where the flooding is. Output module 118 may output how serious the flood waters is based on the results of visualization of the hydrodynamics of flood waters. Output module 118 may provide property ratings for insurance. Output module 118 may output contour lines against existing elevation data.

FIG. 2 is a flowchart 200 depicting operational steps of flood analysis module 110 in accordance with an embodiment of the present disclosure.

Flood analysis module 110 operates to classify regular waters by using cartographic data in a first location. Flood analysis module 110 also operates to generate a water stream network including a watershed based on elevation data (e.g., from Radar and LiDAR data). Flood analysis module 110 operates to perform statistical analysis of spectral information from a multi-spectral satellite image over water bodies including the regular waters and flood waters. Flood analysis module 110 operates to correlate the spectral statistics of the multi-spectral satellite image to kinetic energy of the flood waters using machine learning techniques and physical modeling. Flood analysis module 110 operates to build a learning model based on the correlation between the spectral statistics and the flood waters with the kinetic energy. Flood analysis module 110 operates to estimate kinetic energy of flood waters in a second location using the learning model. Flood analysis module 110 operates to generate a geo-referenced raster imagery of the estimated flood waters kinetic energy. Flood analysis module 110 operates to evaluate a flooding risk for the second location based on the estimated flood waters kinetic energy in conjunction with a weather prediction for an upcoming flooding event.

In step 202, flood analysis module 110 classifies regular waters by using cartographic data 120 in a first location. Flood analysis module 110 classifies regular waters based on cartographic data 120 for a certain location. Flood analysis module 110 may take cartographic data 120, Radar data 122, and LiDAR data 124 to classify regular (e.g., non-flood) water bodies. For example, regular water bodies may be regular waters in lakes, dams, and river streams. Cartographic data 120 may include map information for the certain location. Cartographic data 120 may be map data of the certain location. Cartographic data 120 may include map information. Cartographic data 120 may be collected using manual survey, GPS devices, aerial photography, and other sources, or use local knowledge of an area. Cartographic data 120 may be a raster image (arrays of discrete numerical integer values) or vectorized data (e.g., a collection series of pixels, dots or points, lines, and (multi-)polygons). Radar data 122 may be data that is detected and collected by an object detection system that uses radio waves to determine the range, altitude, direction of movement, and speed of objects. LiDAR data 124 may be data that is detected and collected in a technology of light detection and ranging that uses light in the form of a pulsed laser to measure ranges (variable distances).

In step 204, flood analysis module 110 generates a water stream network including a watershed based on elevation data, for example, from Radar data 122 and LiDAR data 124. Flood analysis module 110 may use the elevation data to generate the water stream network and delineate the watershed starting from a location that has known flood waters. Flood analysis module 110 may identify scenes where the kinetic energy of waters is known or can be estimated from available elevation data and precipitation data 126.

In step 206, flood analysis module 110 performs statistical analysis of spectral information from multi-spectral satellite imagery 128 over water bodies including the regular waters and flood waters. Flood analysis module 110 may take multi-spectral satellite imagery 128 of a flooding event and perform statistics over pixels classified as water bodies from cartographic data 120 for a certain location. Flood analysis module 110 may recognize non-flood water bodies are likely still water bodies in a flood. Flood analysis module may recognize the spectral properties of waters distinguish the waters from other lands. Flood analysis module 110 may determine that the statistics of the flood waters is different when compared to ordinary water bodies. For example, flood analysis module 110 may recognize that flood water streams may have high kinetic energy and can be muddy and brownish by comparing the spectral statistics with and without a flood. Flood analysis module 110 may use the pixel statistics to identify pixels of flooded land within the watershed identified to locally confine areas of flooding. Flood analysis module 110 may use the elevation data to assist in identifying pixels of flooded land. Flood analysis module 110 may further confine potential areas of flooding on a global scale in the watershed with the water stream network in conjunction with the fusion of temporally aggregated precipitation data 126.

In step 208, flood analysis module 110 correlates the spectral statistics of multi-spectral satellite imagery 128 to kinetic energy of the flood waters using machine learning techniques and physical modeling. Flood analysis module 110 may estimate kinetic energy of flood waters from color dynamics. For example, given that areas with water body marked in a map carries flood waters, flood analysis module 110 may pick a region around a dam to infer flood water's pixel value statistics for the different spectral bands. Flood analysis module 110 may query the satellite raster bands filtered against rasterized cartographic data where the water body has color, e.g., red, green, blue.

In step 210, flood analysis module 110 builds learning model 114 based on the correlation between the spectral statistics and the flood waters with the kinetic energy. Flood analysis module 110 may perform data fusion with cartographic data 120, weather data (e.g., precipitation data 126), and stream network information to generate spectral statistics. Flood analysis module 110 may perform visualization of the hydrodynamics of flood waters on spectral statistics of satellite imagery potentially assisted by stream network building from elevation data and aggregation of precipitation from weather (forecasting).

In step 212, flood analysis module 110 estimates kinetic energy of flood waters in a second location using learning model 114. Flood analysis module 110 may use insights from learning model 114 in conjunction with weather prediction to identify and rate areas and human infrastructure at risk for an upcoming flooding event. Flood analysis module 110 may estimate kinetic energy for flood waters (machine learning inference) where the information is desired, but cannot be derived by other means. Flood analysis module 110 may provide emergency response and urban infrastructure planning from visual presentation of results of visualization of the hydrodynamics of flood waters.

In step 214, flood analysis module 110 generates a geo-referenced raster imagery of the estimated flood waters kinetic energy. Flood analysis module 110 may integrate a scalable spatio-temporal data store for rapid data fusion and visualization interface for a user inspection. Flood analysis module 110 may allow a distributed geospatial database to automatically generate geo-referenced raster imagery of estimates of flood waters kinetic energy, solely based on an input as minimal as a cartographic map of water bodies and a single multi-spectral satellite image. Flood analysis module 110 may use more satellite imagery potentially simply to improve accuracy of the kinetic energy estimates. Flood analysis module 110 may provide geospatially registered visualization of cartographic data 120 and semi-transparent overlay of estimated flood water's kinetic energy and extent of flood with opacity slide bar for analysts to inspect area of interest. Flood analysis module 110 may present a geospatial video sequence for temporal evolution analysis by using multiple satellite imagery snapshots. Flood analysis module 110 may provide a result in computer consumable, downloadable data formats such as geo-referenced imagery (e.g., in a GeoTIFF format) for the analyst to further process. Flood analysis module 110 may assemble a query for flood waters visualization, for example, a red and near-infrared band may indicate a strong signal. Flood analysis module 110 may filter multiple bands (e.g., blue, green, red, near-infrared, and short-wave infrared) of multi-spectral satellite imagery 128 by restricting to numerical values not bigger than about the mean plus two standard deviations and not smaller than the minimum value. Flood analysis module 110 may recognize geospatial pixels that are not flood waters may have values less likely in all the bands given. In an example, flood analysis module 110 may detect noise due to cloud shadows that reduce the overall reflectance from the ground bringing it close to that of water that is heavily absorbing in all bands under consideration—except for the reddish signal from the muddy flood waters. Flood analysis module 110 may provide colorization of water that helps to understand how backwater forms and might become a problem although a smaller creek feeding the main river might not carry high level waters itself. Flood analysis module 110 may provide different coloring of flood waters to help interpret the kinetic energy involved. For example, flood analysis module 110 may provide color-encoding, e.g., blue color for still water (not muddy), green color for active flood waters, yellow and red colors for highly muddy water, i.e. high kinetic energy involved. Flood analysis module 110 may indicate the floodwaters state that helps to estimate human infrastructure at risk close to the water. Flood analysis module 110 may recognize human dam infrastructure at work. In another example, besides artifacts from clouds, flood analysis module 110 may recognizes some islands in the floods crosschecking the elevation context, e.g. human infrastructure facilities in the floods being elevated compared to the surroundings of the floods, blue color for low elevation, green color for an average elevation, red color for high elevation.

In step 216, flood analysis module 110 evaluates a flooding risk for a second location based on the estimated flood waters kinetic energy in conjunction with a weather prediction for an upcoming flooding event. Flood analysis module 110 may populate a new raster data layer of the scalable spatio-temporal data store that can be used to filter and fuse with other existing data available in database such as population density. Flood analysis module 110 may output emergency response and urban infrastructure planning from visual presentation of results of visualization of the hydrodynamics of flood waters. For example, flood analysis module 110 may output information about where the flooding is. Flood analysis module 110 may estimate and output how serious the flood waters is based on the results of visualization of the hydrodynamics of flood waters. Flood analysis module 110 may indicate which infrastructure is at risk to be damaged or destructed. In another example, flood analysis module 110 may provide property ratings for insurance. For example, flood analysis module 110 may use historical data of visualization of the hydrodynamics of flood waters to estimate a flood risk of a property. Flood analysis module 110 may take kinetic energy estimation and geospatially integrate the values in a given radius around the property's center, e.g., the higher the value the higher the risk of damage to the property. Flood analysis module 110 may perform terrain analysis by deriving local and relative contour lines of terrain from a time series of the flood. Flood analysis module 110 may validate contour lines against existing elevation data.

Figure 3A:
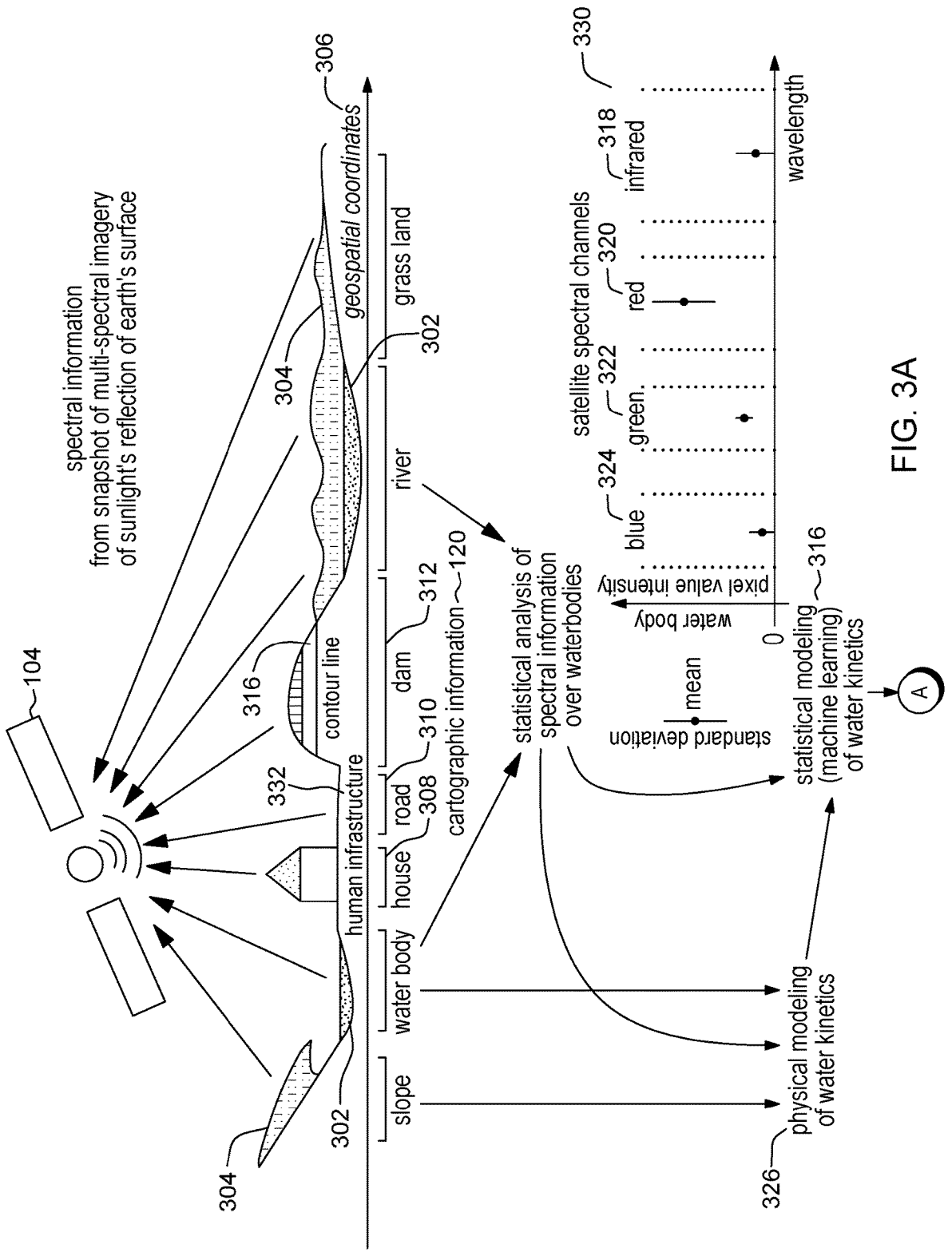
FIGS. 3A-3B illustrate an exemplary functional diagram and data flow of the flood analysis module within the computing device of FIG. 1, in accordance with one or more embodiments of the present disclosure.
Figure 3B:
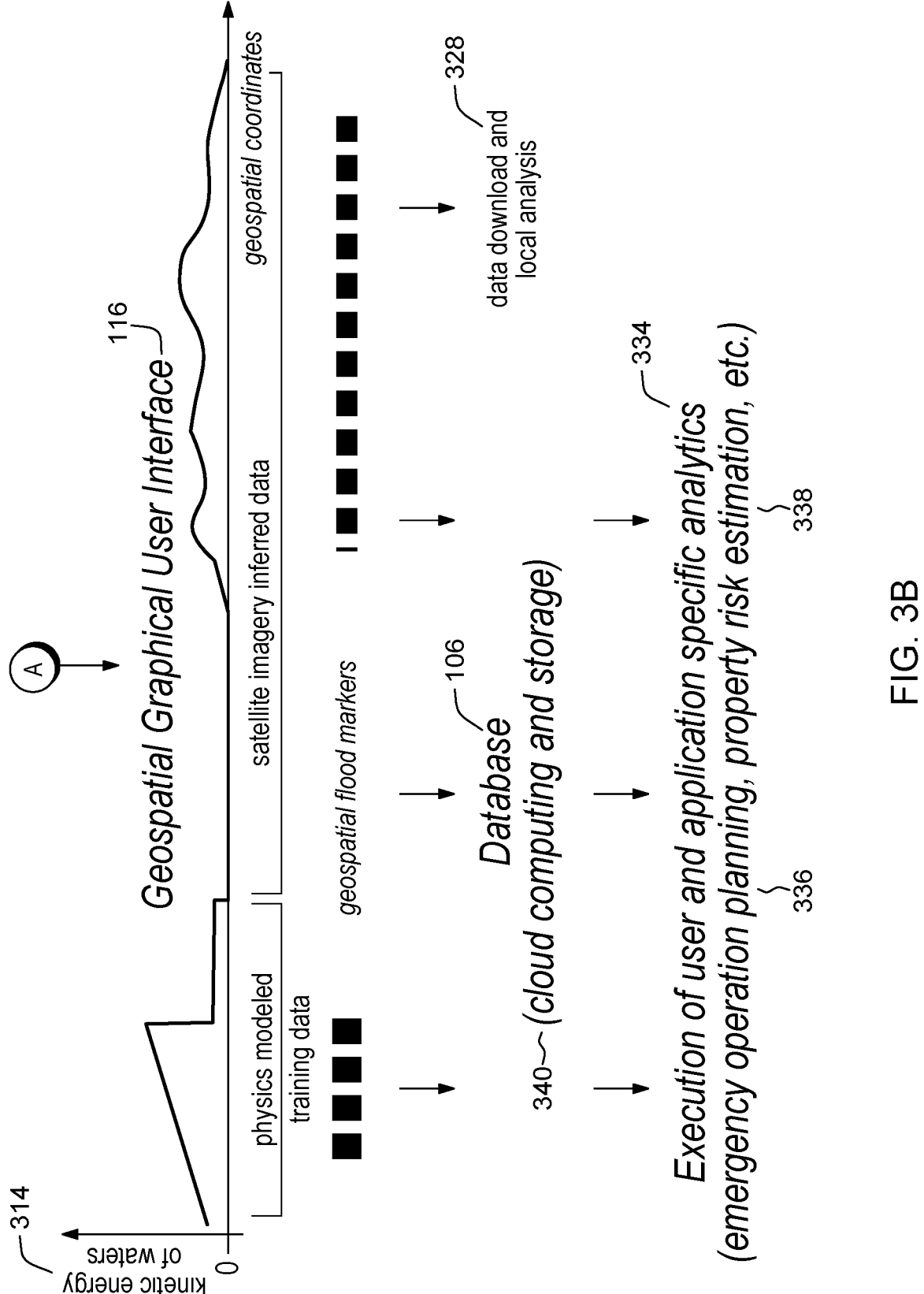

FIGS. 3A-3B illustrates an exemplary functional diagram and data flow of flood analysis module 110 in accordance with one or more embodiments of the present disclosure.

In the example of FIGS. 3A-3B, flood analysis module 110 performs statistical analysis of spectral information of multi-spectral satellite imagery 128 from remote sensing data collector 104 (e.g., a satellite) over water bodies including regular waters 302 (e.g., lakes, rivers, normal still waters) and flood waters 304. Flood analysis module 110 may take multi-spectral satellite imagery 128 of a flooding event and perform statistics over pixels classified as water bodies 302, 304 from cartographic data 120 for a certain location as illustrated in geospatial coordinates 306. Flood analysis module 110 may recognize non-flood water bodies 302 are likely still water bodies in a flood. Flood analysis module may recognize the spectral properties of waters distinguish the waters from other lands (e.g., house 308, road 310, dam 312). Flood analysis module 110 may determine that the statistics of the flood waters 304 is different when compared to regular water bodies 302. For example, flood analysis module 110 may recognize that flood water streams may have high kinetic energy 314 and can be muddy and brownish by comparing the spectral statistics with and without a flood. Flood analysis module 110 may use the pixel statistics to identify pixels of flooded land within the watershed identified to locally confine areas of flooding. Flood analysis module 110 may correlate the spectral statistics of multi-spectral satellite imagery 128 to kinetic energy 314 of the flood waters using machine learning techniques. Flood analysis module 110 may estimate kinetic energy 314 of flood waters from color dynamics. For example, given that areas with water body marked in a map carries flood waters, flood analysis module 110 may pick a region around dam 312 to infer flood water's pixel value statistics for the different spectral bands 318. Flood analysis module 110 may query the satellite raster bands filtered against rasterized cartographic data where the water body has color, e.g., red 320, green 322, blue 324. Flood analysis module 110 may build learning model 114 (e.g., statistical modeling 316) based on the correlation between the spectral statistics and flood waters 304 with kinetic energy 314. E.g. by the aid of the digital terrain model, flood analysis module 110 may generate physical modelling of water kinetics 326 as an input for statistical modeling 316 with the spectral statistics of spectral information over water bodies 302, 304. Flood analysis module 110 may perform data fusion with cartographic data 120, weather data (e.g., precipitation data 126), and stream network information to generate spectral statistics. Flood analysis module 110 may estimate kinetic energy of flood waters using learning model 114. Flood analysis module 110 may estimate kinetic energy 314 for flood waters (machine learning inference) where the information is desired, but cannot be derived by other means. Flood analysis module 110 may generate a geo-referenced raster imagery of the estimated flood waters kinetic energy 314. Flood analysis module 110 may integrate a scalable spatio-temporal data to database 106 for rapid data fusion and visualization interface 116 for a user inspection. Flood analysis module 110 may allow a distributed geospatial database to automatically generate geo-referenced raster imagery of estimates of flood waters kinetic energy, based on an input as minimal as cartographic data 120 (e.g., cartographic map) of water bodies 302, 304 and a single multi-spectral satellite imagery 128. Flood analysis module 110 may use more satellite imagery potentially simply to improve accuracy of the kinetic energy estimates. Flood analysis module 110 may provide a result in computer consumable, downloadable data 328 formats such as geo-referenced imagery (e.g., in a GeoTIFF format) for the analyst to further process. Flood analysis module 110 may assemble a query for flood waters visualization, for example, a red 320 and infrared 330 band may indicate a strong signal of flood. Flood analysis module 110 may filter multiple bands (e.g., blue 324, green 322, red 320, near-infrared 330, and short-wave infrared 330) of multi-spectral satellite imagery 128 by restricting to numerical values not bigger than about the mean plus two standard deviations and not smaller than the minimum value. Flood analysis module 110 may recognize geospatial pixels that are not flood waters may have values less likely in all the bands given. In an example, flood analysis module 110 may detect noise due to cloud shadows that reduce the overall reflectance from the ground bringing close to that of water that is heavily absorbing in all bands under consideration -except for the reddish signal from the muddy flood waters. Flood analysis module 110 may provide colorization of water that helps to understand how backwater forms and might become a problem although a smaller creek feeding the main river might not carry high level waters itself. Flood analysis module 110 may provide different coloring of flood waters to help interpret kinetic energy 314 involved. For example, flood analysis module 110 may provide color-encoding, e.g., blue 324 color for still water (not muddy), green 322 color for active flood waters, yellow and red 320 colors for highly muddy water, i.e. high kinetic energy 314 involved. Flood analysis module 110 may indicate the flood waters 304 state that helps to estimate human infrastructure 332 at risk close to the water. Flood analysis module 110 may recognize dam 312 infrastructure at work. Flood analysis module 110 may populate a new raster data layer of the scalable spatio-temporal data store (e.g., cloud computing and storage 340 that can be used to filter and fuse with other existing data available in database 106 such as population density. Flood analysis module 110 may provide execution of user and application specific analytics 334, e.g., emergency operation planning 336 and property risk estimation 338. Flood analysis module 110 may output emergency response (e.g., emergency operation planning 336) and urban infrastructure planning (property risk estimation 338) from visual presentation of results of visualization of the hydrodynamics of flood waters.

Figure 4:
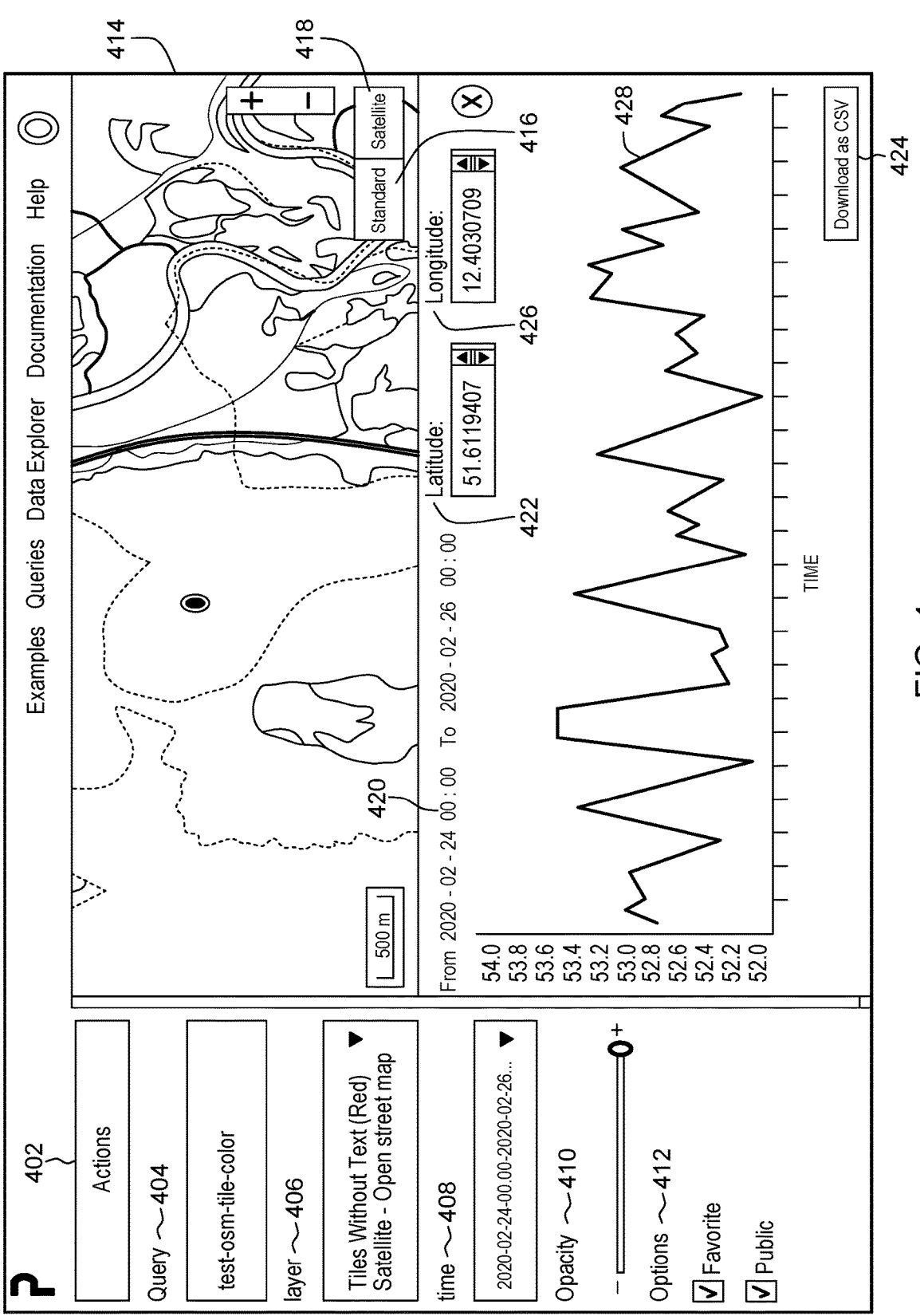
FIG. 4 illustrates an exemplary user interface of the flood analysis module within the computing device of FIG. 1, in accordance with one or more embodiments of the present disclosure.

FIG. 4 illustrates an exemplary user interface 116 of flood analysis module 110 in accordance with one or more embodiments of the present disclosure.

In the example of FIG. 4, user interface 116 provides an interface for a user to access database 106 and multi-spectral satellite imagery 128. For example, user interface 116 can be a browser with an API plugin to access database 106 and multi-spectral satellite imagery 128. In another example, user interface 116 may provide a command line tool and access credentials to database 106 and multi-spectral satellite imagery 128. User interface 116 may provide a menu of actions including query 404, layer 406, time 408, opacity 410, and options 412. For example, flood analysis module 110 through user interface 116 may extract spectral statistics for flood waters. Flood analysis module 110 through user interface 116 may point query for rasterized map 414 RGB channel values of water body. Flood analysis module 110 may query satellite raster bands filtered against rasterized map data where the water body has color. User interface 116 may provide standard 416 and satellite 418 options for displaying a map, e.g., map 414. User interface 116 may provide interface to query data base on time frame 420. User interface 116 may display latitude 422 and longitude 426 information. Flood analysis module 110 may run a point query through user interface 116 against layers 406. Flood analysis module 110 may switch to standard 416 background map showing a map, and a user may click on any water body displayed in user interface 116. Flood analysis module 110 may limit all bands (e.g., from multi-spectral satellite imagery 128) to be queried to low pixel value intensities below 0.4 (the reflectance values may be roughly normalized to the interval [0,1]). Flood analysis module 110 through user interface 116 may present example time series 428. Flood analysis module 110 may output a query result in a human-readable format (e.g., download as a comma-separated values (CSV) file 424). CSV file may be a text file that has a specific format which allows data to be saved in a table structured format.

Figure 5:
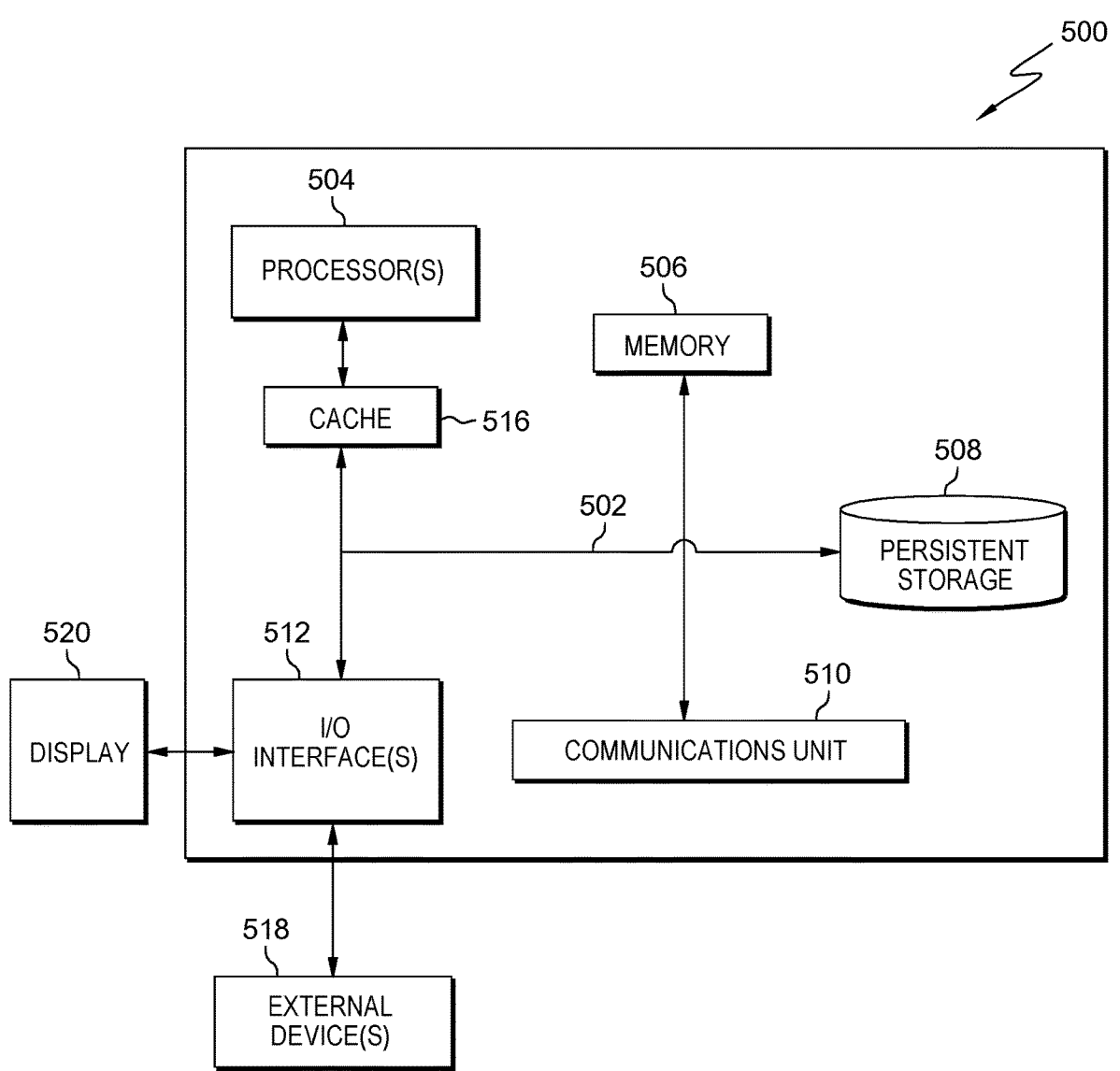
FIG. 5 is a block diagram of components of the computing device of FIG. 1, in accordance with an embodiment of the present disclosure.

FIG. 5 depicts a block diagram 500 of components of computing device 102 in accordance with an illustrative embodiment of the present disclosure. It should be appreciated that FIG. 5 provides only an illustration of one implementation and does not imply any limitations with regard to the environments in which different embodiments may be implemented. Many modifications to the depicted environment may be made.

Computing device 102 may include communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Flood analysis module 110 may be stored in persistent storage 508 and in memory 506 for execution by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Flood analysis module 110 may be downloaded to persistent storage 508 through communications unit 510.

I/O interface(s) 512 allows for input and output of data with other devices that may be connected to computing device 102. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., flood analysis module 110 can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
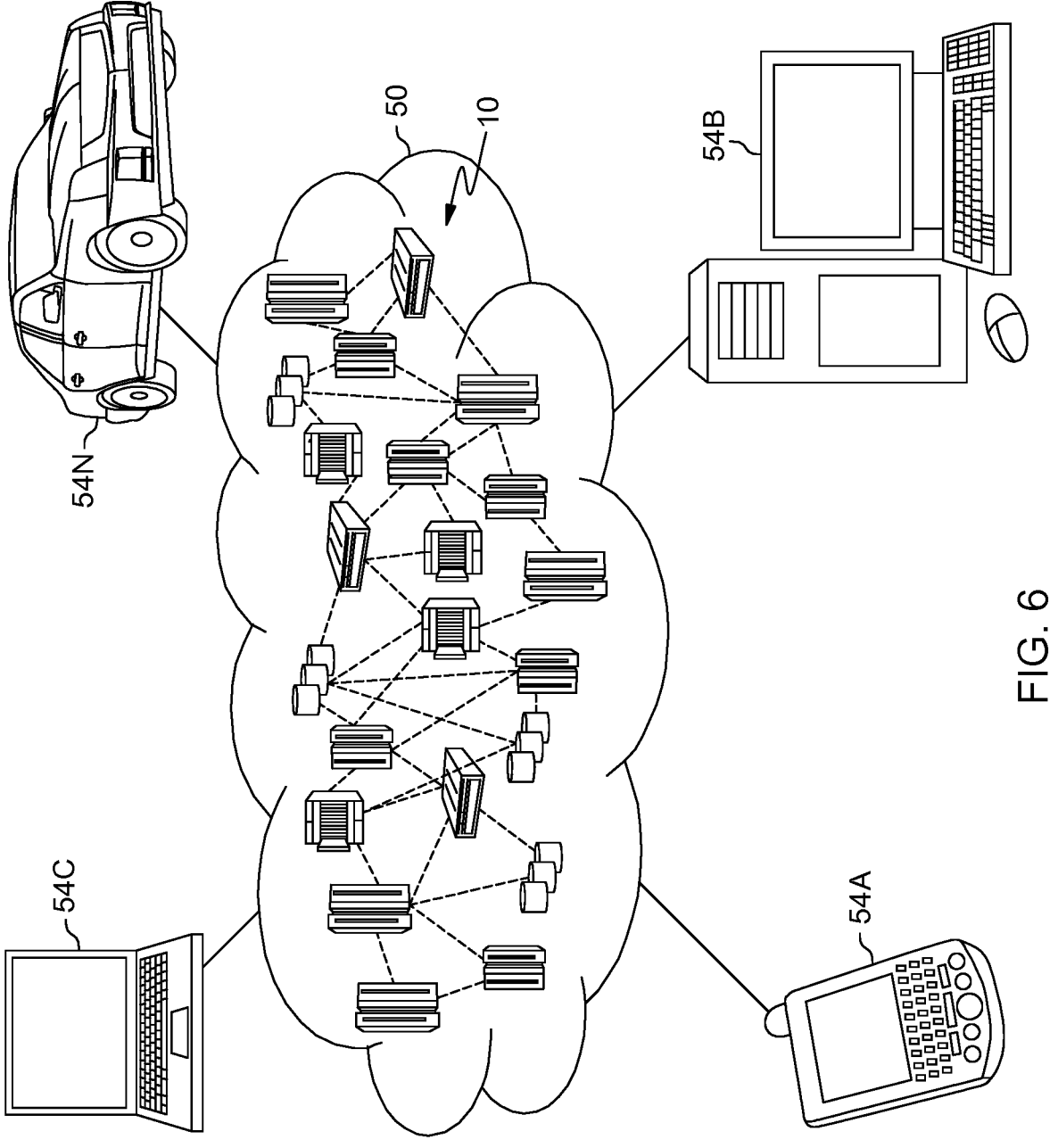
FIG. 6 depicts an embodiment of a cloud computing environment in accordance with the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
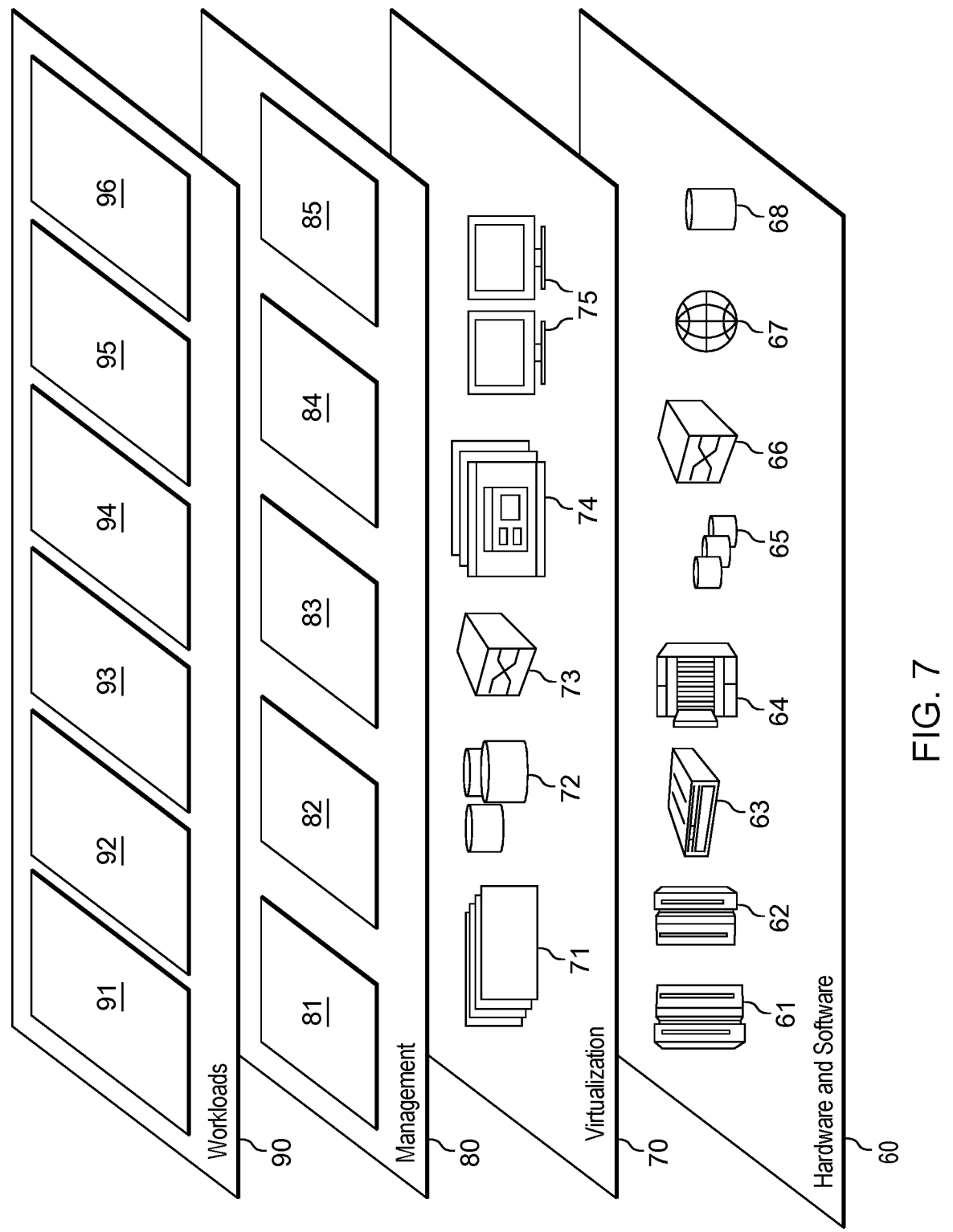
FIG. 7 depicts an embodiment of abstraction model layers of a cloud computing environment, in accordance with the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, flood analysis module 110 as described above with respect to floodwater analysis environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:

classifying, by one or more processors, regular waters by using cartographic data in a first location;

generating, by one or more processors, a water stream network including a watershed based on elevation data, wherein the water stream network delineates a watershed starting from a location that has known flood waters, wherein the water stream network comprises an interconnected system of channels that collect water that subsequently drains to the watershed;

performing, by one or more processors, statistical analysis over pixels classified as water bodies of spectral information to distinguish regular water from other lands from a multi-spectral satellite imagery comprising vectorized data, radio wave data and pulsed laser light data in visible and infrared wavelengths over water bodies including the regular waters and flood waters using the pixel statistics to identify pixels of flooded land within an identified watershed by separating image data within specific wavelength ranges across an electromagnetic spectrum by filters using spectral analysis in terms of spectrum of frequencies with frequency dependent energy values of photons;

correlating, by one or more processors, the spectral statistics of the multi-spectral satellite imagery to kinetic energy of the flood waters using machine learning techniques and physical modeling;

building, by one or more processors, a learning model based on the correlation between the spectral statistics and the flood waters with the kinetic energy by performing data fusion of cartographic data, weather data and stream information to generate spectral statistics;

allowing, by the learning model, a distributed geospatial database to automatically generate geo-referenced raster imagery of estimates of flood waters kinetic energy, solely based on an input as minimal as a cartographic map of water bodies and a single multi-spectral satellite image;

estimating, by one or more processors, kinetic energy of flood waters in a second location using the learning model;

detecting, by the one or more processors, noise due to cloud shadows using the learning model; and evaluating, by one or more processors, a flooding risk for the second location based on the estimated flood waters kinetic energy and the detecting of the noise due to cloud shadows in conjunction with a weather prediction for an upcoming flooding event.

2. The computer-implemented method of claim 1, wherein the statistical analysis of spectral information includes spectral statistics over pixels classified as the regular waters being still water bodies in a flood, spectral properties of water distinguishing the regular water bodies from other lands, and the statistics of the flood waters being different compared to the regular waters bodies.

3. The computer-implemented method of claim 2, further comprising:

using the spectral statistics for visualization of hydrodynamics of flood waters.

4. The computer-implemented method of claim 1, wherein generating the water stream network comprises delineating the watershed starting from the first location that has known flood waters.

5. The computer-implemented method of claim 4, further comprising:

using pixel statistics to identify pixels of flooded land within the watershed identified, wherein the water stream network in conjunction with fusion of temporally aggregated precipitation confines potential areas of flooding on a global scale in the watershed.

6. The computer-implemented method of claim 1, further comprising:

generating, by one or more processors, a geo-referenced raster imagery of the estimated flood waters kinetic energy; and outputting, by one or more processors, the geo-referenced raster imagery for analysis.

7. A computer program product comprising:

one or more computer readable storage medium, and program instructions collectively stored on the one or more computer readable storage medium, the program instructions executable by a computing system to cause the computing system to perform a method comprising:

classifying regular waters by using cartographic data in a first location;

generating, by one or more processors, a water stream network including a watershed based on elevation data, wherein the water stream network delineates a watershed starting from a location that has known flood waters, wherein the water stream network comprises an interconnected system of channels that collect water that subsequently drains to the watershed;

performing statistical analysis over pixels classified as water bodies of spectral information to distinguish regular water from other lands from a multi-spectral satellite imagery comprising vectorized data, radio wave data and pulsed laser light data in visible and infrared wavelengths over water bodies including the regular waters and flood waters using the pixel statistics to identify pixels of flooded land within an identified water shed by separating image data within specific wavelength ranges across an electromagnetic spectrum by filters using spectral analysis in terms of spectrum of frequencies with frequency dependent energy values of photons;

correlating the spectral statistics of the multi-spectral satellite imagery to kinetic energy of the flood waters using machine learning techniques and physical modeling;

building a learning model based on the correlation between the spectral statistics and the flood waters with the kinetic energy;

allowing, by the learning model, a distributed geospatial database to automatically generate geo-referenced raster imagery of estimates of flood waters kinetic energy, solely based on an input as minimal as a cartographic map of water bodies and a single multi-spectral satellite image;

estimating kinetic energy of flood waters in a second location using the learning model; and evaluating a flooding risk for the second location based on the estimated flood waters kinetic energy in conjunction with a weather prediction for an upcoming flooding event.

8. The computer program product of claim 7, wherein the statistical analysis of spectral information includes spectral statistics over pixels classified as the regular waters being still water bodies in a flood, spectral properties of water distinguishing the regular water bodies from other lands, and the statistics of the flood waters being different compared to the regular waters bodies.

9. The computer program product of claim 8, wherein the method further comprises:

using the spectral statistics for visualization of hydrodynamics of flood waters.

10. The computer program product of claim 7, wherein generating the water stream network comprises delineating the watershed starting from the first location that has known flood waters.

11. The computer program product of claim 10, wherein the method further comprises:

using pixel statistics to identify pixels of flooded land within the watershed identified, wherein the water stream network in conjunction with fusion of temporally aggregated precipitation confines potential areas of flooding on a global scale in the watershed.

12. The computer program product of claim 7, wherein the method further comprises:

generating a geo-referenced raster imagery of the estimated flood waters kinetic energy; and outputting the geo-referenced raster imagery for analysis.

13. A computer system comprising:

one or more computer processors, one or more computer readable storage medium, and program instructions stored on the one or more computer readable storage medium for execution by at least one of the one or more computer processors, the program instructions, when being executed by the at least one of the one or more computer processors, cause the computer system to perform a method comprising:

classifying regular waters by using cartographic data in a first location;

generating, by one or more processors, a water stream network including a watershed based on elevation data, wherein the water stream network delineates a watershed starting from a location that has known flood waters, wherein the water stream network comprises an interconnected system of channels that collect water that subsequently drains to the watershed;

performing statistical analysis over pixels classified as water bodies of spectral information to distinguish regular water from other lands from a multi-spectral satellite imagery comprising vectorized data, radio wave data and pulsed laser light data in visible and infrared wavelengths over water bodies including the regular waters and flood waters using the pixel statistics to identify pixels of flooded land within an identified water shed by separating image data within specific wavelength ranges across an electromagnetic spectrum by filters using spectral analysis in terms of spectrum of frequencies with frequency dependent energy values of photons;

correlating the spectral statistics of the multi-spectral satellite imagery to kinetic energy of the flood waters using machine learning techniques and physical modeling;

building a learning model based on the correlation between the spectral statistics and the flood waters with the kinetic energy;

allowing, by the learning model, a distributed geospatial database to automatically generate geo-referenced raster imagery of estimates of flood waters kinetic energy, solely based on an input as minimal as a cartographic map of water bodies and a single multi-spectral satellite image;

estimating kinetic energy of flood waters in a second location using the learning model; and evaluating a flooding risk for the second location based on the estimated flood waters kinetic energy in conjunction with a weather prediction for an upcoming flooding event.

14. The computer system of claim 13, wherein the statistical analysis of spectral information includes spectral statistics over pixels classified as the regular waters being still water bodies in a flood, spectral properties of water distinguishing the regular water bodies from other lands, and the statistics of the flood waters being different compared to the regular waters bodies.

15. The computer system of claim 14, wherein the method further comprises:

using the spectral statistics for visualization of hydrodynamics of flood waters.

16. The computer system of claim 13, wherein generating the water stream network comprises delineating the watershed starting from the first location that has known flood waters.

17. The computer system of claim 16, wherein the method further comprises:

using pixel statistics to identify pixels of flooded land within the watershed identified, wherein the water stream network in conjunction with fusion of temporally aggregated precipitation confines potential areas of flooding on a global scale in the watershed.

18. The computer system of claim 13, wherein the method further comprises:

generating a geo-referenced raster imagery of the estimated flood waters kinetic energy; and outputting the geo-referenced raster imagery for analysis.

* * * * *